United States Patent
Kuo et al.

(10) Patent No.: US 11,323,910 B2
(45) Date of Patent: May 3, 2022

(54) UPLINK TRANSMISSION METHODS BASED ON COLLISION-TRIGGERED ADAPTATION

(71) Applicant: NOKIA TECHNOLOGIES OY, Espoo (FI)

(72) Inventors: Ping-Heng Kuo, Bristol (GB); Dawid Koziol, Glogow (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 159 days.

(21) Appl. No.: 16/824,821

(22) Filed: Mar. 20, 2020

(65) Prior Publication Data

US 2020/0314681 A1 Oct. 1, 2020

Related U.S. Application Data

(60) Provisional application No. 62/825,171, filed on Mar. 28, 2019.

(51) Int. Cl.
*H04W 28/02* (2009.01)
*H04W 72/14* (2009.01)
*H04W 74/08* (2009.01)
*H04W 72/10* (2009.01)

(52) U.S. Cl.
CPC ....... *H04W 28/0252* (2013.01); *H04W 72/10* (2013.01); *H04W 72/14* (2013.01); *H04W 74/0825* (2013.01)

(58) Field of Classification Search
None
See application file for complete search history.

(56) References Cited

U.S. PATENT DOCUMENTS

| | | | | |
|---|---|---|---|---|
| 2010/0034153 | A1* | 2/2010 | Lee | H04W 72/10 370/329 |
| 2014/0126363 | A1* | 5/2014 | Zeng | H04W 28/12 370/230 |
| 2019/0150176 | A1* | 5/2019 | Pelletier | H04W 72/0453 370/329 |
| 2021/0144580 | A1* | 5/2021 | Alfarhan | H04W 80/02 |

OTHER PUBLICATIONS

Interdigital, "Summary of [104#38][NR/IIoT] Intra UE prioritization UL Data Data (Interdigital)", 3GPP TSG-RAN WG2 Meeting #105, R2-1901458, Feb. 25-Mar. 1, 2019, Athens, Greece.

* cited by examiner

*Primary Examiner* — Jutai Kao
(74) *Attorney, Agent, or Firm* — Squire Patton Boggs (US) LLP (57) ABSTRACT

Systems, methods, apparatuses, and computer program products for facilitating transmission of uplink traffic, for example, that has been deprioritized due to resource collision with transmission of other data or control information are provided. One method may include receiving, at a user equipment, a configuration per logical channel (LCH) of triggering criteria relating to resource collision from a network node. The method may also include modifying a logical channel prioritization (LCP) setting for the logical channel (LCH) based on the configuration.

18 Claims, 6 Drawing Sheets

UPLINK TRANSMISSION METHODS BASED ON COLLISION-TRIGGERED ADAPTATION

CROSS-REFERENCE TO RELATED APPLICATIONS

This application claims priority from U.S. provisional patent application No. 62/825,171 filed on Mar. 28, 2019. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for transmission of uplink traffic.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In a first aspect of the present disclosure, a method that may be implemented by a UE is provided. The method may include the UE receiving configuration per LCH of triggering criteria relating to resource collision from a network node. The method may also include modifying a logical channel prioritization (LCP) setting for the logical channel (LCH) based on the configuration.

In a variant, the method may also include the UE evaluating whether transmission of traffic from a LCH has experienced a delay exceeding a certain threshold due to uplink resource collision to determine if the UE should temporarily change the LCP setting for this LCH. When the delay for transmission of traffic from the LCH does not exceed the threshold, then the method may include proceeding with processing the traffic from the LCH without modifying the LCP setting. When the delay for transmission of traffic from the LCH exceeds the threshold, then the method may include modifying the LCP setting for this LCH.

In a variant, the modifying may include modifying the LCP setting for a limited time controlled by a timer.

According to a variant, the LCP setting may include parameters relating to LCP and LCH mapping restrictions. In certain variants, the parameters relating to LCP and LCH mapping restrictions may include LCH priority, Prioritized Bit Rate (PBR), Bucket Size Duration (BSD), and LCH Mapping Restriction rule(s), mapping rules of LCHs to CG grant configurations, and/or any other LCH mapping restriction that can be taken into account during LCP procedures. In a variant, the mapping rules of LCHs to CG grant configurations may include, for example, rules determining which LCHs may use which CG configurations.

In a variant, if transmission of the traffic from a LCH has been delayed for a certain amount of time exceeding the threshold, then the modifying may include at least one of: temporarily increasing the priority level of the LCH, increasing the prioritized bit rate (PBR) of this LCH, and/or modifying or lifting the LCH mapping restrictions so this LCH can be mapped to a wider range of grants.

In a variant, the method may include the UE modifying the LCP parameters and/or LCH mapping restrictions of a LCH based on a prediction prior to actual occurrence of such collision.

In one variant, the method may include starting a timer when the LCH is switched to a modified LCP setting and, upon expiration of the timer, the LCH may fall back to the original LCP setting.

In a variant, when the LCP setting of a LCH is changed due to resource collision or foreseeable resource collision, the method may further include sending an indication to the network for purposes of notification of the LCH change. In one example, the indication may include the indices or identifiers of the affected LCHs.

In a variant, the method may include receiving, from the network, an indication acknowledging the notification, and initiating the change of the LCP setting of the LCH upon the reception of the acknowledgement from the network.

Also in a first aspect of the present disclosure, a method that may be implemented by a network node is provided. The method may include the network node configuring or pre-configuring a UE with triggering criteria relating to uplink resource collision for modification of LCP setting and/or the guidelines relating to temporary LCP setting modification.

In a variant, the triggering criteria relating to uplink resource collision for modification of LCP setting may include at least one of: the threshold of the time that transmission of traffic from a LCH has been delayed due to resource collision that trigger the LCP setting modification; the value of N consecutive collisions that trigger the LCP setting modification; the type of colliding transmission (PUSCH or PUCCH); and/or the length of (anticipated) delaying-time of traffic from this LCH due to resource collision.

In a variant, the guidelines relating to temporary LCP setting modification may include at least one of: the conditional LCP setting to be applied if the criteria relating to resource collision are met; the list of existing LCH mapping restrictions that should be lifted or modified if the triggering criteria are met; and/or the timer period length where the modified LCP setting should be used once triggered, in terms of OFDM symbols, mini-slots, slots, or standard time units such as seconds. In a further variant, the conditional LCP setting may include LCP parameter values and LCH mapping restrictions.

In a variant, the method may also include, when the LCP setting of a LCH is changed, receiving an indication from the UE to notify of the change in LCP setting. In another variant, the notification may include the indices and/or identifiers of the affected LCHs.

In a further variant, the method may also include sending to the UE an indication acknowledging the notification of LCP setting change.

In another variant, the method may include the network node predicting that the collision is going to happen based on the knowledge of the UE's traffic patterns. According to this variant, the method may then include sending an indication to the UE to change the LCP setting of the LCH without waiting for the UE to notify the network node about the collision or foreseeable collision.

In a second aspect of the present disclosure, a method that may be implemented by a UE is provided. The method may include the UE receiving, from the network, a configuration including at least one of: at least one new CG transmission parameters for use for a CG after a transmission of traffic from a LCH or a transmission on the CG has delayed due to resource collision with other transmissions, a condition under which the CG should change the transmission parameters, and/or a duration that the new transmission parameters should be used before changing back to default setting (e.g., a timer period). The method may also include the UE autonomously modifying the periodicity and/or other transmission parameters of a CG, for example, by decreasing the periodicity and/or other transmission parameters of the CG to transmit delayed traffic based on certain criteria, such as the configuration received from the network.

In a variant, the decreasing of the periodicity and/or other transmission parameters may be done for pre-defined period of time in order to allow more frequent transmission opportunities.

In a variant, apart from the periodicity, the decreasing may include autonomously modifying other transmission parameters of the CG. For example, in a variant, parameters such as MCS and the number of repetitions per CG occasion may be modified to ensure the transmission of packets delayed by collision can be carried out in a rapid and reliable fashion.

In one variant, the method may include starting a timer when the autonomous modification of CG transmission parameters is triggered and, before the timer expires, the CG may use a modified periodicity along with other parameters, if any. In a variant, when the timer expires, the method may include the CG changing these parameters back to the default setting.

In a further variant, when the autonomous modification of periodicity and/or other parameters of a CG is triggered, the method may include transmitting an indication to the network to notify the network of the temporary modification of the periodicity and/or CG parameters.

Optionally, in a variant, the method may include receiving from the network an acknowledgement in response to the notification, and beginning to modify the CG periodicity and/or other parameters upon the reception of the acknowledgement from the network.

Also in a second aspect of the present disclosure, a method that may be implemented by a network node is provided. The method may include the network node configuring or pre-configuring a UE with at least one of: at least one new CG transmission parameters for use for a CG after a transmission of traffic from a LCH or a transmission on the CG has delayed due to resource collision with other transmissions, a condition under which the CG should change the transmission parameters, and/or a duration that the new transmission parameters should be used before changing back to default setting (e.g., a timer period).

In a variant, when an autonomous modification of periodicity and parameters of a CG is triggered by a collision, the method may include receiving from the UE an indication notifying the network node of the temporary modification of CG periodicity and/or other parameters. Optionally, in a variant, the method may also include sending an acknowledgement to the UE in response to the notification.

In a third aspect of the present disclosure, a method that may be implemented by a UE is provided. The method may include the UE receiving, from the network, a configuration of the indices and/or identifiers of other CGs to be activated when a transmission of traffic a LCH or a transmission on a CG has delayed due to resource collision with other transmissions. The method may include the UE autonomously activating one or more other CGs to transmit delayed traffic based on certain criteria.

In a variant, the criteria may include how long or how many times such the transmission has been delayed. In one variant, the one or more other CGs may be activated for a pre-defined period of time. In a variant, the CG(s) that are activated may be based on the indices and/or identifiers of other CGs received from the network.

In one variant, a timer may be started when the autonomous activation of at least one other CG is triggered and, while the timer is running according to a pre-configured time interval, more than one active CGs can be used for transmitting the packets from the LCHs that have been delayed due to the previous resource collision.

In a variant, when at least one other CGs is activated due to the collision, the method may include sending an indication to the network to notify the network of the temporary CG activation. Optionally, in a variant, the method may further include receiving from the network an acknowledgement in response to the notification, and the UE activating the at least one other CG upon the reception of such acknowledgement from the network.

Also in a third aspect of the present disclosure, a method that may be implemented by a network node is provided. The method may include the network node configuring or pre-configuring a UE with the indices and/or identifiers of other CGs to be activated.

In a variant, when one or more other CGs are activated due to a collision, the method may include receiving an indication from the UE for purposes of notification of the temporary CG activation. Optionally, in a variant, the method may further include transmitting to the UE an acknowledgement in response to the notification.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for transmission of uplink traffic, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

It is noted that some embodiments are described below as being performed by or in a gNB. However, reference to a gNB or the performance of some embodiments using a gNB is just one example and embodiments should not be considered as being limited to just this example. As another, non-limiting example, certain embodiments may also be applied in other network nodes, such as a base station, access node, access point, node B, eNB, or the like.

Provisioning radio resources that can be used by delay-sensitive traffic is a key approach introduced in NR for URLLC. In particular, uplink transmission based on Configured Grants (CG) has been adopted in 3GPP Release-15 to reduce potential latency caused by scheduling request (SR)/buffer status report (BSR) procedures. With CG, uplink resources are pre-allocated and occur in a periodic manner, and a UE may utilize these pre-allocated resources for uplink transmission whenever it is available without needing to wait for a scheduling grant from a gNB.

The CG supported by 5G NR can be classified into Type-1 and Type-2. Type-1 CG is solely configured by the radio resource control (RRC) and is activated as soon as the RRC configuration is completed. Type-2 CG is configured by the RRC, but it is activated/deactivated (along with remaining scheduling information) by layer 1 (L1) signaling dynamically.

In both cases, the gNB assigns a set of parameters such as periodicity, modulation and coding scheme (MCS), resource size/timing and power-related settings to each grant, so the UE can use these grants properly. In Release-15, one single CG can be activated in each bandwidth part (BWP) per serving cell. As an extension to support multiple traffic types with various quality of service (QoS) requirements, it has been agreed recently in the URLLC enhancement study item to support multiple active CGs per BWP in Release-16. In such cases, the gNB may pre-configure multiple CG configurations, and then activate a subset of these CG configurations depending on the traffic needs. Furthermore, these CGs could be grouped into different sets, where the CGs within a set (dubbed as CG configuration group) may share some common transmission parameters, such as MCS and periodicity. In addition, based on logical channel (LCH) mapping restrictions, some CG configurations may only carry certain types of traffic. For example, presuming there are two CGs configured (namely CG1 and CG2) for a UE with 3 LCHs (namely LCH1, LCH2, and LCH3), we may have a mapping restriction where CG1 can only carry traffic from LCH1 and LCH2, while CG2 can only carry traffic from LCH3.

Due to the possibility of multiple active CGs, along with dynamic grants (DG) assigned by the gNB spontaneously based on the BSR from the UE, it is anticipated that some of these transmission opportunities provided by different configured/dynamic grants would overlap in time. Because a UE typically can only transmit one physical uplink shared channel (PUSCH) per serving cell at a time, the UE may have to conduct prioritization among the colliding grants to determine which one of these conflicting transmission opportunities should be proceeded, while stopping/cancelling other conflicting grants. These stopped/cancelled grants may be referred to as deprioritized grants in the following. The 3GPP study item (SI) for NR Industrial IoT (IIoT) has targeted to investigate different scenarios involving different types of grants.

As mentioned above, when multiple active CGs are configured, each of the active configured grants could be restricted to a certain subset of LCHs. Thus, one possible way for prioritization is based on the priority of LCHs mapped to each of the colliding grants. This has been preliminary agreed in the 3GPP SI for NR IIoT. Moreover, in addition to collision with other uplink data, resource collision with uplink control (e.g., physical uplink control channel (PUCCH)) may also result in traffic delay if the control is prioritized based on certain mechanisms.

In view of the above, in order to support multiple active CGs per BWP in Release-16, a gNB may pre-configure multiple CG configurations and activate a subset of these CG configurations depending on the traffic need. Example embodiments discussed in the following address at least the problem of how to facilitate rapid transmission of uplink traffic that have been deprioritized due to resource collision with transmission of other data/control information.

With intra-UE prioritization, apparently the transmission of packets for the deprioritized grants (the grants that are not transmitted due to resource collision with other grants) will be delayed. Although it has been deprioritized possibly because the corresponding LCH priority is lower than other transmissions, it is noted that a UE may handle multiple URLLC traffic simultaneously. For instance, for IIoT use cases, a UE may have to concurrently handle applications such as augmented reality (AR)/virtual reality (VR) and motion control that have very different traffic patterns, but are applications that are essentially delay-sensitive. Therefore, it is undesirable to delay the transmission of deprioritized grants too much.

It is noted that typically CGs are used to carry URLLC traffic and, if it is a CG that has been deprioritized, it is important to make sure that deprioritized traffic can be transmitted rapidly to fulfil their corresponding latency requirement. Although it is possible that the UE may embed a BSR on the colliding grant in a bid to request additional resources immediately, it takes some time for the gNB to process and send another downlink control information (DCI) which causes additional latency. If the traffic is periodic and hence predictable, the gNB may take some precaution on resource allocation to minimize the impacts of collision. Nevertheless, many URLLC traffic originating from certain applications may arrive in an aperiodic fashion and hence not predictable. Therefore, certain embodiments may be configured to facilitate rapid transmission of both periodic and aperiodic uplink traffic that have been deprioritized due to resource collision with transmission of other data/control information.

Example embodiments provide several methods relating to how delay-sensitive traffic can be can be handled when the transmission of packets corresponding to such traffic is stopped or cancelled (deprioritized) due to resource collision with other uplink transmission, such as PUSCH or PUCCH. Certain embodiments provide at least the following methods to facilitate rapid transmission of packets delayed by such resource collision.

A first embodiment may include a method directed to adaptive logical channel prioritization (LCP) parameters and LCH mapping restrictions. In this embodiment, for a LCH corresponding to the traffic that has been delayed due to resource collision with other PUSCH/PUCCH transmission, the UE may change the configured LCP settings (including LCP parameters and LCH mapping restrictions) of the LCH.

A second embodiment is directed to a method for a UE autonomously decreasing the periodicity and/or other transmission parameters of a CG to transmit delayed traffic based on certain criteria (e.g., how long or how many times such transmission has been delayed), for a pre-defined period of time.

A third embodiment is directed to a method for a UE autonomously activating at least one other CG to transmit delayed traffic based on certain criteria (e.g., how long or how many times such transmission has been delayed), for a pre-defined period of time. It is noted that the first embodiment, the second embodiment, and third embodiment introduced above may be combined in any suitable matter. For example, since the second embodiment and third embodiment relate to adaptation of CG configuration(s) upon resource collision, the second and the third embodiment may be combined according to certain examples.

As introduced above, the first embodiment may include a method of autonomous LCP adaptation upon collision. In this embodiment, when the medium access control (MAC) service data units (SDUs) from a LCH have failed in transmission due to resource collision of its transmission opportunity with other data or control information consecutively for at least N>1 times, the UE may automatically modify the at least one LCP parameter and/or LCH mapping restrictions that have been pre-configured for this LCH.

Figure 1A:
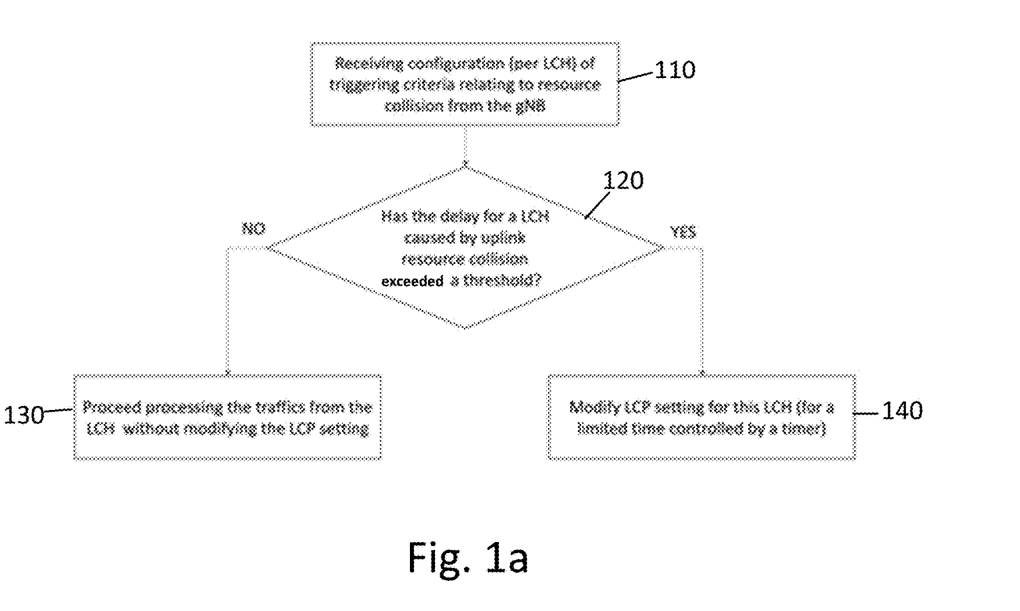
FIG. 1a illustrates an example flow diagram of a method, according to an embodiment.

FIG. 1a illustrates an example flow diagram of a method, which may be performed by a UE, according to the first embodiment. As illustrated in the example of FIG. 1a, the method may include, at 110, a UE receiving configuration (per LCH) of triggering criteria relating to resource collision from network node, such as a gNB. The method may then include, at 120, the UE evaluating or determining whether transmission of traffic from a LCH has suffered from a delay exceeding a certain threshold due to uplink resource collision to determine if it should temporarily change the LCP setting for this LCH.

Continuing with the example of FIG. 1a, when the delay for transmission of traffic from the LCH does not exceed the threshold, then the method may include, at 130, proceeding with processing the traffic from the LCH without modifying the LCP setting. When the delay for transmission of traffic from the LCH exceeds the threshold, then the method may include, at 140, modifying the LCP setting for this LCH. In one example, as discussed in further detail below, the LCP setting may be modified for a limited time controlled by a timer.

According to an embodiment, the LCP setting may include parameters relating to LCP and LCH mapping restrictions. In certain embodiments, the parameters relating to LCP and LCH mapping restrictions may include LCH priority, Prioritized Bit Rate (PBR), Bucket Size Duration (BSD), and LCH Mapping Restriction rule(s), such as allowedSCS-List, allowedServingCells, configuredGrantType1Allowed, maxPUSCH-Duration, mapping rules of LCHs to CG grant configurations, allowed grants, allowed grant priorities, and/or any other LCH mapping restriction that can be taken into account during LCP procedures. According to some embodiments, if allowedSCS-List is present, UL MAC SDUs from this logical channel can only be mapped to the indicated numerology. In some embodiments, if allowedServingCells is present, UL MAC SDUs from this logical channel can only be mapped to the serving cells indicated in this list (this is typically used for PDCP duplication to ensure the duplicates are transmitted on a different cell to the original). According to some embodiments, if configuredGrantType 1Allowed is present, UL MAC SDUs from this logical channel can be transmitted on a configured grant type 1. In some embodiments, if maxPUSCH-Duration is present, UL MAC SDUs from this logical channel can only be transmitted using uplink grants that result in a PUSCH duration shorter than or equal to the duration indicated by this field. The mapping rules of LCHs to CG grant configurations may include, for example, rules determining which LCHs may use which CG configurations. Such mapping can be explicit (e.g., CG config #1 may be used only by LCH1 and LCH2) or implicit (e.g., CG config #1 may be used only by LCH with LCH priority>threshold).

As an example, if the traffic from a LCH has been delayed for a certain amount of time exceeding a threshold, then the modifying 140 may include the UE temporarily increasing the priority level of this LCH, increasing the prioritized bit rate (PBR) of this LCH, and/or modifying or lifting the LCH mapping restrictions so this LCH can be mapped to a wider range of grants. In one example, the threshold may be set to '0' and, in this case, the modifying 140 may take place immediately after the collision occurs. As an example, the UE may modify the LCH mapping restrictions such that a LCH can be temporarily served by another serving cell or another CG configurations that were originally forbidden for this LCH due to the configured LCH mapping restrictions.

As discussed above, in some cases the UE may predict the resource collision based on knowledge relating to traffic patterns and uplink resource allocation. Thus, the UE may also change the LCP parameters and/or LCH mapping restrictions of a LCH based on the prediction prior to actual occurrence of such collision.

In one example, the modifying 140 may include starting a timer when the LCH is switched to a modified LCP setting. Upon the timer expiration, the LCH may fall back to the original LCP setting (including both LCP parameters and LCH mapping restriction). The timer period length may be configured by the network (e.g., gNB) or determined by the UE itself. Alternatively, the timer period length may be fixed by specifications.

In one example, when the LCP setting of a LCH is changed due to resource collision or foreseeable resource collision, the method may further include the UE sending an indication to the network (e.g., gNB) for purposes of notification, for example, including the indices/identifiers of the affected LCHs. This indication may be sent by dynamic control signalling such as uplink control information (UCI) or MAC control element (CE). In one example, the method may include the UE receiving, from the network (e.g., gNB), an indication acknowledging such notification, and the UE may begin to change the LCP setting of the LCH upon the reception of the acknowledgement from the network.

Figure 1B:
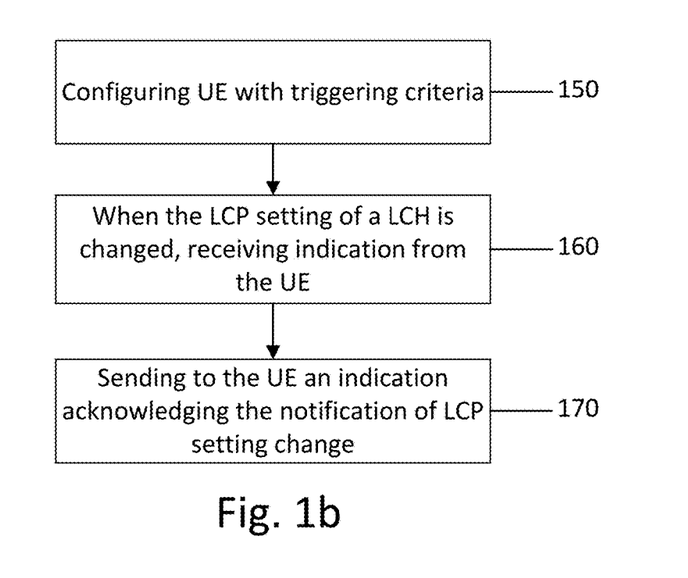
FIG. 1b illustrates an example flow diagram of a method, according to an embodiment.

FIG. 1b illustrates another example flow diagram of a method, which may be performed by a network node, according to the first embodiment. In some examples, the network node may be a base station, eNB, gNB, an access node, access point, or the like.

As illustrated in the example of FIG. 1b, the method may include, at 150, configuring or pre-configuring a UE with the triggering criteria relating to uplink resource collision for modification of LCP setting and/or the guidelines relating to temporary LCP setting modification. The triggering criteria relating to uplink resource collision for modification of LCP setting may include, for example: the value of N consecutive collisions that trigger the LCP setting modification; the type of colliding transmission (PUSCH or PUCCH); and/or the length of (anticipated) delaying-time of traffic from this LCH due to resource collision. The guidelines relating to temporary LCP setting modification may include, for example: the conditional LCP setting (LCP parameter values and LCH mapping restrictions) to be applied if the criteria relating to resource collision are met; the list of existing LCH mapping restrictions that should be lifted or modified if the triggering criteria are met; and/or the timer period length where the modified LCP setting should be used once triggered, in terms of OFDM symbols, mini-slots, slots, or standard time units such as seconds.

Continuing with the example of FIG. 1b, the method may also include, at 160, when the LCP setting of a LCH is changed, receiving an indication from the UE to notify the network of the change in LCP setting. The notification may include the indices/identifiers of the affected LCHs. This indication may be received via dynamic control signalling such as UCI or MAC CE. In one example, the method may also include, at 170, sending to the UE an indication acknowledging the notification of LCP setting change.

In another example, the method may include the network (e.g., gNB) predicting that the collision is going to happen based on the knowledge of the UE's traffic patterns. The method may then include sending an indication to the UE to change the LCP setting of the LCH without waiting for the UE to notify the network about the collision or foreseeable collision.

As introduced above, the second embodiment may include a method of autonomous CG reconfiguration of transmission parameters upon collision. In this embodiment, when the transmission of a URLLC packet mapped to a CG has been halted due to resource collision for N>1 consecutive CG occasions, the CG may change (e.g., decrease) its periodicity temporarily to allow more frequent transmission opportunities. Hence, it facilitates reduction of transmission delay that has been caused by previous resource collision with other transmission (can be either PUSCH or PUCCH). The value of N may be pre-configured by the gNB or may be fixed by specification. In one example, it may be more efficient to trigger the temporary CG modification once the collision occurs, which means N=1.

Figure 2A:
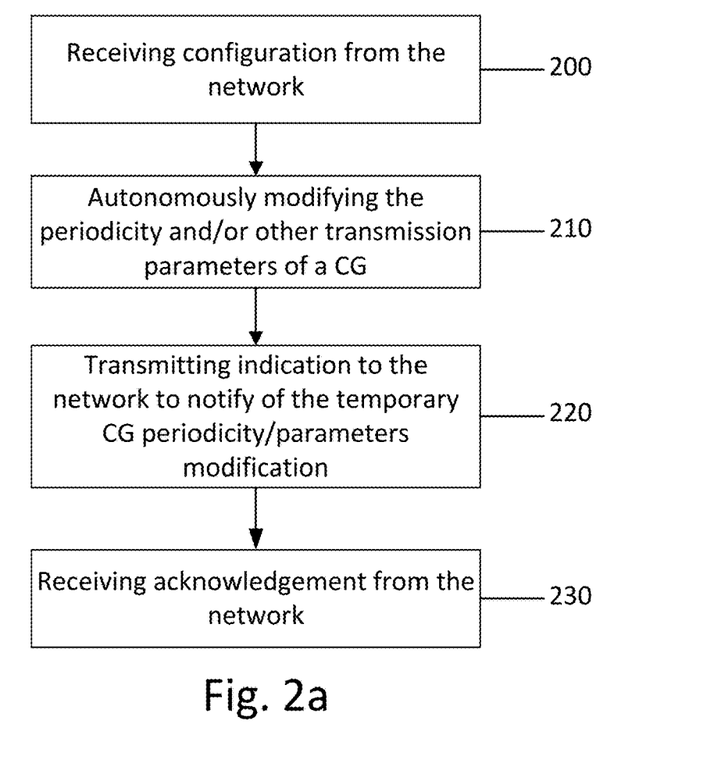
FIG. 2a illustrates an example flow diagram of a method, according to an embodiment.

FIG. 2a illustrates an example flow diagram of a method, which may be performed by a UE, according to the second embodiment. As illustrated in the example of FIG. 2a, the method may include, at 200, a UE receiving, from the network, a configuration including one or more of new CG transmission parameter(s) for use for a CG after a transmission of traffic from a LCH or a transmission on the CG has delayed due to resource collision with other transmissions (e.g., periodicity, MCS, etc.), a condition under which a CG should change the at least one new transmission parameter (s) (e.g., after how many collisions), and/or a duration that the new transmission parameter(s) should be used before changing back to default setting (e.g., a timer period).

As further illustrated in the example of FIG. 2a, the method may also include, at 210, the UE autonomously modifying, for example, by decreasing the periodicity and/or other transmission parameters of a CG to transmit delayed traffic based on certain criteria, such as the configuration received from the network at step 200. In an embodiment, the decreasing may be done for pre-defined period of time in order to allow more frequent transmission opportunities.

Furthermore, apart from the periodicity, other transmission parameters of this CG may be modified autonomously as well. For example, the parameters such as MCS and the number of repetitions per CG occasion may be altered to ensure the transmission of packets delayed by collision can be carried out in a rapid and also more reliable fashion, given that the delay requirement of this packet may not afford much more latency attributed to mechanisms such as hybrid automatic repeat request (HARQ) re-transmission.

In one example, the method may include starting a timer when the autonomous modification of transmission parameters of a CG is triggered. Then, within a pre-configured time interval, the CG may use a modified periodicity along with other parameters, if any. When the timer expires, the method may include the CG changing these parameters back to the default setting.

In an example, when the autonomous modification of periodicity and parameters of a CG is triggered by the collision, the method of FIG. 2a may include, at 220, the UE transmitting an indication to the network (e.g., gNB) for purposes of providing a notification of the temporary CG periodicity and/or other parameters modification, which allows the network (e.g., gNB) to react to these changes properly. This indication may be sent by dynamic control signalling, such as UCI or MAC CE, and the content of which may further indicate at least one LCHs that have been affected by the delay caused by such resource collision. In the cases where the MAC CE is used for such indication, the MAC CE can be included in the MAC PDU corresponding to the colliding grant that is prioritized over the deprioritized CG, and such MAC CE may further include the information relating to the timing of the anticipated CG re-configuration, so the network (e.g., gNB) is able to know when these changes would occur and can react appropriately. Optionally, the method of FIG. 2a may also include, at 230, the UE receiving from the network (e.g., gNB) an acknowledgement in response to the notification, and the UE may begin to modify the CG periodicity and/or other parameters upon the reception of such an acknowledgement from the network.

Figure 2B:
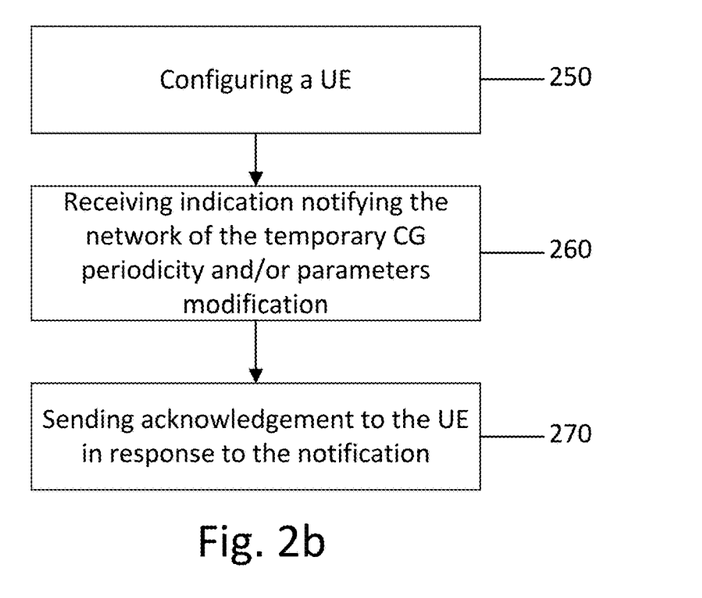
FIG. 2b illustrates an example flow diagram of a method, according to an embodiment.

FIG. 2b illustrates another example flow diagram of a method, which may be performed by a network node, according to the second embodiment. In some examples, the network node may be a base station, eNB, gNB, an access node, access point, or the like.

As illustrated in the example of FIG. 2b, the method may include, at 250, configuring or pre-configuring a UE with one or more of at least one new CG transmission parameter (s) for use for a CG after a transmission of traffic from a LCH or a transmission on the CG has delayed due to resource collision with other transmissions, a condition under which the CG should change the transmission parameter(s), and/or a duration that the new transmission parameter(s) should be used before changing back to default setting (e.g., a timer period).

In an example, when an autonomous modification of periodicity and parameters of a CG is triggered by a collision, the method of FIG. 2b may include, at 260, receiving from the UE an indication notifying the network of the temporary CG periodicity and/or other parameters modification. This indication allows the network (e.g., gNB) to react to these changes properly. This indication may be received by dynamic control signalling, such as UCI or MAC CE. In one example, the indication may further indicate at least one LCHs that have been affected by the delay caused by such resource collision. If a MAC CE is used for the indication, the MAC CE can be included in the MAC PDU corresponding to the colliding grant that is prioritized over the deprioritized CG, and the MAC CE may further include the information relating to the timing of the anticipated CG transmission parameters re-configuration, so the network (e.g., gNB) is able to know when these changes would occur and can react appropriately. Optionally, the method of FIG. 2b may also include, at 270, sending an acknowledgement to the UE in response to the notification, such that the UE may begin to modify the CG periodicity and/or other parameters upon the reception of such an acknowledgement from the network.

Figure 2C:
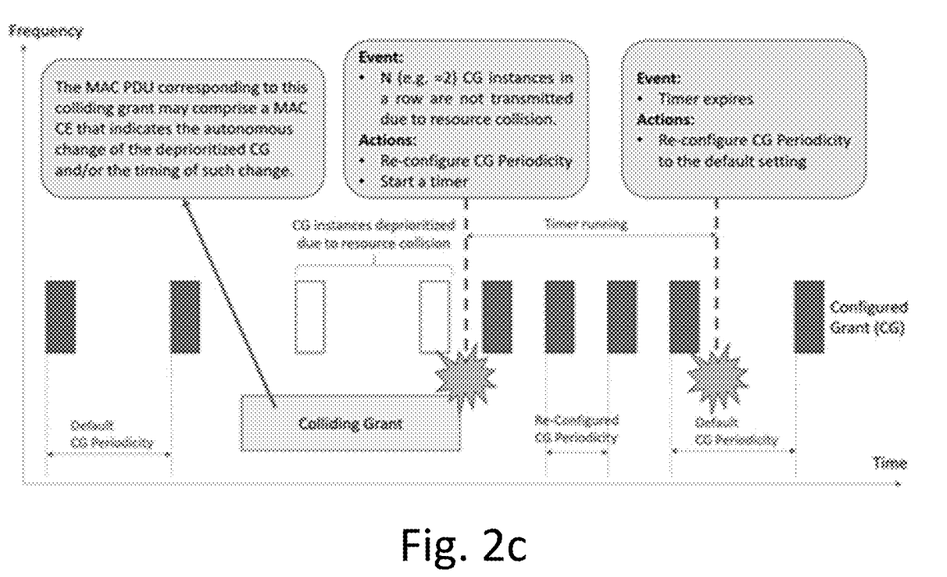
FIG. 2c is a diagram illustrating an example application of certain embodiments.

FIG. 2c depicts an example illustration of the second embodiment. In the example of FIG. 2c, the periodicity of a CG is decreased for a limited time (controlled by a timer) after the transmission of its N=2 consecutive occasions have been halted due to resource collision with another uplink grant. Also, the MAC PDU sent on the prioritized grant may embed a MAC CE to inform the network (e.g., gNB) regarding the temporary periodicity (and/or other parameters) change of the CG, so the network (e.g., gNB) is able to handle this properly. It is noted that FIG. 2c is just one example of the second embodiment and not in limitation thereof. It is noted that the example of FIG. 2c may be modified in several ways, such as by utilizing a different value for N.

As introduced above, the third embodiment may include a method of autonomous CG activation upon collision. In this embodiment, when the transmission of a URLLC packet has been halted due to resource collision for N>1 consecutive occasions, the UE may autonomously activate at least one other CGs that was originally deactivated. Typically, this at least one newly activated CG may be able to provide the same QoS requirement for the delayed packet. For instance, if the packet was originally conveyed by a CG, then the at least one other newly activated CGs may share some common parameters, or belong to the same CG configuration group as the original CG. In one example, it may be more efficient to activate other CGs temporarily once the collision occurs, which means N=1.

Figure 3A:
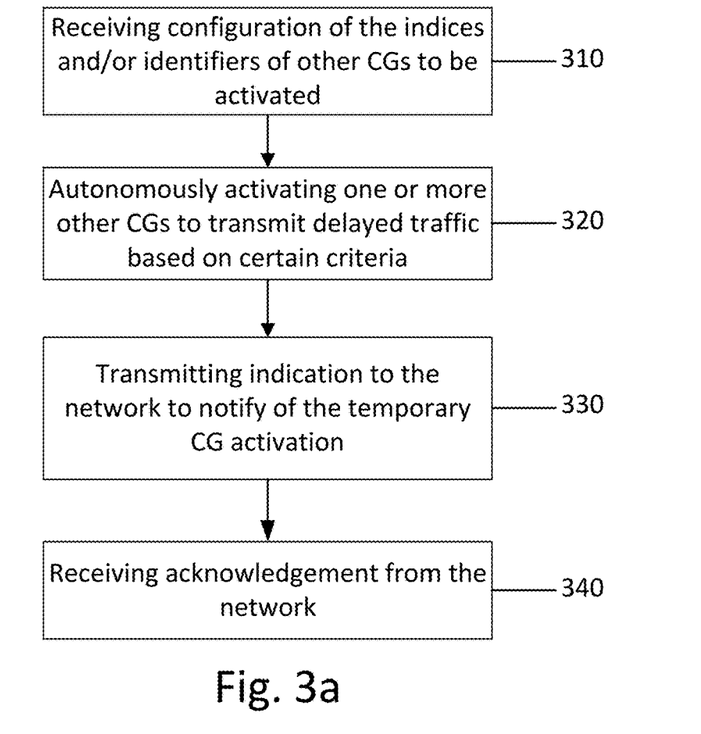
FIG. 3a illustrates an example flow diagram of a method, according to an embodiment.

FIG. 3a illustrates an example flow diagram of a method, which may be performed by a UE, according to the third embodiment. As illustrated in the example of FIG. 3a, the method may include, at 310, a UE receiving, from the network (e.g., a gNB), a configuration of the indices and/or identifiers of other CGs to be activated. The method may include, at 320, the UE autonomously activating one or more other CGs to transmit delayed traffic based on certain criteria. For example, the criteria may include how long or how many times such the transmission has been delayed. In one example, the one or more other CGs may be activated for a pre-defined period of time. The CG(s) that are activated may be based on the indices and/or identifiers of other CGs received from the network.

In one example, a timer may be started when the autonomous activation of at least one other CG is triggered. Then, within a pre-configured time interval, more than one active CGs can be used for transmitting the packets from the LCHs that have been delayed by the previous resource collision. Therefore, the corresponding LCHs can have more transmission opportunities (across multiple active CGs) during a limited time interval and hence the delayed traffic can be sent more quickly. When the timer expires, the at least one activated CGs may be automatically deactivated.

In an example, when at least one other CGs is activated due to the collision, the method of FIG. 3a may include, at 330, the UE sending an indication to the network (e.g., gNB) for purposes of notification of the temporary CG activation, which allows the network (e.g., gNB) to react to uplink transmission of these newly activated CGs properly. This indication may be sent by dynamic control signalling, such as UCI or MAC CE, and the content of which may further indicate at least one LCHs that have been affected by the delay caused by such resource collision. In the cases where the MAC CE is used for such indication, the MAC CE can be included in the MAC PDU corresponding to the colliding grant that is prioritized over the deprioritized CG, and such MAC CE may further include the information relating to the timing of the anticipated CG activation, so that the network (e.g., gNB) is able to react appropriately. Optionally, the method may further include, at 340, receiving from the network (e.g., gNB) an acknowledgement in response to the notification, and the UE may activate the at least one other CG upon the reception of such acknowledgement from the network (e.g., gNB).

Figure 3B:
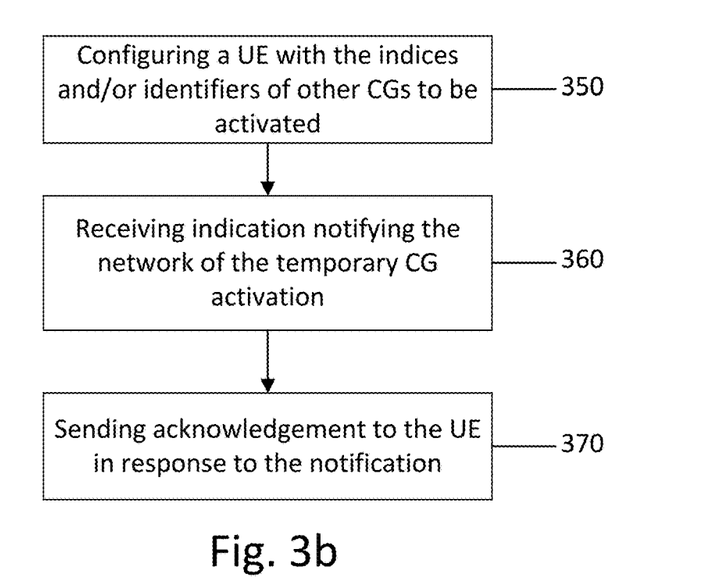
FIG. 3b illustrates an example flow diagram of a method, according to an embodiment.

FIG. 3b illustrates another example flow diagram of a method, which may be performed by a network node, according to the third embodiment. In some examples, the network node may be a base station, eNB, gNB, an access node, access point, or the like.

As illustrated in the example of FIG. 3b, the method may include, at 350, configuring or pre-configuring a UE with the indices and/or identifiers of other CGs to be activated. In an example, when one or more other CGs are activated due to a collision, the method of FIG. 3b may include, at 360, receiving an indication from the UE for purposes of notification of the temporary CG activation, which allows the network (e.g., gNB) to react to uplink transmission of these newly activated CGs properly. This indication may be received via dynamic control signalling, such as UCI or MAC CE, and the indication may further include at least one LCHs that have been affected by the delay caused by such resource collision. If the MAC CE is used for the indication, then the MAC CE can be included in the MAC PDU corresponding to the colliding grant that is prioritized over the deprioritized CG, and the MAC CE may further include the information relating to the timing of the anticipated CG activation, so that the network (e.g., gNB) is able to react appropriately. Optionally, the method may further include, at 370, transmitting to the UE an acknowledgement in response to the notification, and the UE may activate the at least one other CG upon the reception of such acknowledgement from the network (e.g., gNB).

Figure 3C:
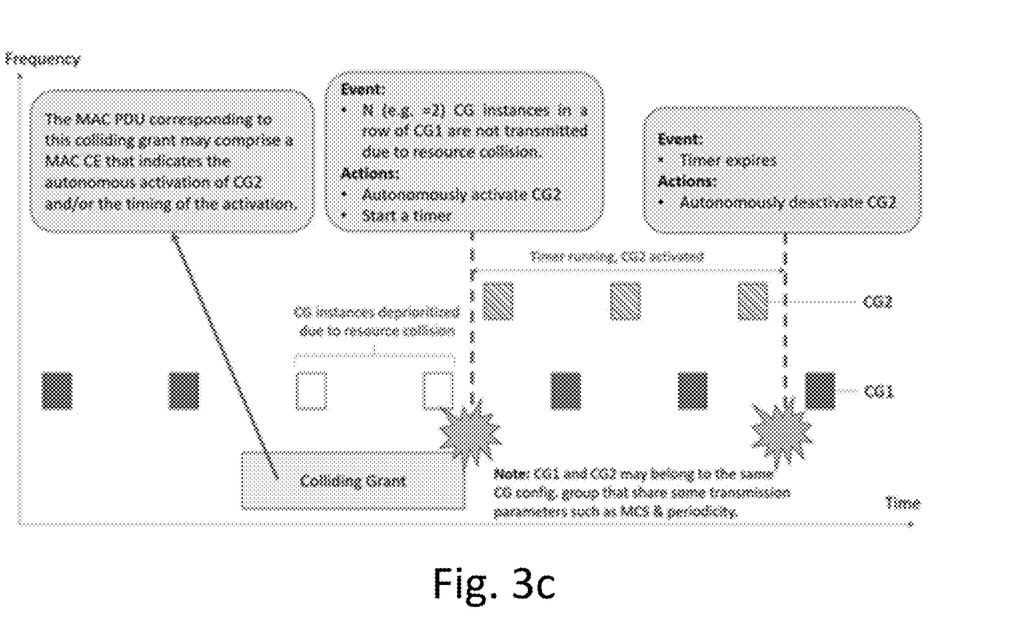
FIG. 3c is a diagram illustrating an example application of certain embodiments.

FIG. 3c illustrates an example illustration of the third embodiment. In the example of FIG. 3c, another CG is activated for a limited time (controlled by a timer) after the transmission of its N=2 consecutive occasions have been halted due to resource collision with another uplink grant. In addition, the MAC PDU sent on the prioritized grant may embed a MAC CE to inform the gNB regarding the temporary activation of CG2, so that the network (e.g., gNB) is able to handle uplink transmission properly.

As mentioned above, since both the second embodiment and the third embodiment relate to adaptation of CG configuration(s) upon resource collision, and the steps or functions described in the second and third embodiment may be combined. For instance, after the transmission of N=1 consecutive occasions of a CG have been halted due to resource collision with another uplink grant, the UE may autonomously reduce the periodicity of the CG and at the same time activate at least one other CGs.

To enable the autonomous re-configuration (second embodiment) or CG activation (third embodiment) behaviour as described in preceding paragraphs, certain preconfiguration by the gNB (via RRC) may be performed. The configuration may be conducted in a per LCH or a per CG fashion, as explained below.

For per LCH pre-configuration, when the transmission of a MAC PDU generated for a CG carrying at least one MAC SDU from this LCH is delayed due to collision, the UE behavior described above is applied to the CG.

For per CG pre-configuration, when the transmission of this CG is delayed due to collision (regardless of the contents of the delayed MAC PDU), the UE behavior described above is applied to the CG.

In both of these cases, the network (e.g., gNB) may provide at least the following information for pre-configuration: the triggering criteria, the details of actions to be taken when triggered, and/or the details relating to the timer. The triggering criteria may include, for example, the value of N consecutive occasions of a CG halted due to resource collision with another uplink grant, a threshold of queueing time that the packet has already experienced, and/or the type of colliding transmission: PUSCH or PUCCH. The details of actions to be taken when triggered may include, for example, the re-configured CG periodicity (for the second embodiment), the re-configured values of at least one CG parameters (for the second embodiment), and/or the indices/identifiers of other CGs to be activated (for the third embodiment). The details relating to the timer may include, for example, the size of interval wherein the re-configured CG periodicity/parameters should be applied, in terms of OFDM symbols, mini-slots, slots, or standard time units such as seconds, and/or the size of interval wherein the other CGs should stay activated, in terms of OFDM symbols, mini-slots, slots, or standard time units such as seconds.

Figure 4A:
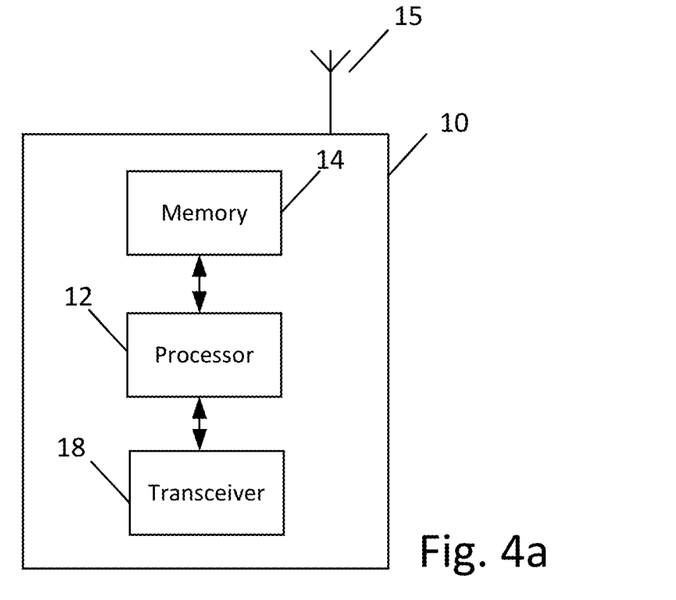
FIG. 4a illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIGS. 1-3. In some embodiments, apparatus 10 may be configured to perform a procedure for facilitating rapid transmission of uplink traffic that may have been deprioritized, for example. In an embodiment, apparatus 10 may represent a network node, such as a gNB.

In one embodiment, apparatus 10 may be controlled by memory 14 and processor 12 to configure or pre-configure a UE with triggering criteria relating to uplink resource collision for modification of LCP setting and/or guidelines relating to temporary LCP setting modification. The triggering criteria relating to uplink resource collision for modification of LCP setting may include, for example: the value of N consecutive collisions that trigger the LCP setting modification; the type of colliding transmission (PUSCH or PUCCH); and/or the length of (anticipated) delaying-time of traffic from this LCH due to resource collision. The guidelines relating to temporary LCP setting modification may include, for example: the conditional LCP setting (LCP parameter values and LCH mapping restrictions) to be applied if the criteria relating to resource collision are met; the list of existing LCH mapping restrictions that should be lifted or modified if the triggering criteria are met; and/or the timer period length where the modified LCP setting should be used once triggered, in terms of OFDM symbols, mini-slots, slots, or standard time units such as seconds.

In this embodiment, when the LCP setting of a LCH is changed, apparatus 10 may be controlled by memory 14 and processor 12 to receive an indication from the UE to notify it of the change in LCP setting. The notification may include the indices/identifiers of the affected LCHs. This indication may be received by apparatus 10 via dynamic control signalling such as UCI or MAC CE. In one example, apparatus 10 may be controlled by memory 14 and processor 12 to transmit, to the UE, an indication acknowledging the notification of LCP setting change.

In another example, apparatus 10 may be controlled by memory 14 and processor 12 to predict that the collision is going to happen based on the knowledge of the UE's traffic patterns. In this example, apparatus 10 may be controlled by memory 14 and processor 12 to send an indication to the UE to change the LCP setting of the LCH without waiting for the UE to notify the apparatus 10 about the collision or foreseeable collision.

In another embodiment, apparatus 10 may be controlled by memory 14 and processor 12 to configure or pre-configure a UE with one or more of new CG transmission parameter(s) for use after the collision (e.g., periodicity, MCS, etc.), a condition under which a CG should change the at least one transmission parameter(s) (e.g., after how many collisions), and/or a duration that the new configuration should be used before changing back to default setting (e.g., a timer period). In an example, when an autonomous modification of periodicity and parameters of a CG is triggered by a collision, apparatus 10 may be controlled by memory 14 and processor 12 to receive from the UE an indication notifying the apparatus 10 of the temporary CG parameters modification. This indication allows the apparatus 10 to react to these changes properly. This indication may be received by dynamic control signalling, such as UCI or MAC CE. In one example, the indication may further indicate at least one LCHs that have been affected by the delay caused by such resource collision. If a MAC CE is used for the indication, the MAC CE can be included in the MAC PDU corresponding to the colliding grant that is prioritized over the deprioritized CG, and the MAC CE may further include the information relating to the timing of the anticipated CG transmission parameter(s) re-configuration, so apparatus 10 is able to know when these changes would occur and can react appropriately. Optionally, apparatus 10 may be controlled by memory 14 and processor 12 to send an acknowledgement to the UE in response to the notification, such that the UE may begin to modify the CG periodicity and/or other parameters upon the reception of such an acknowledgement from the apparatus 10.

In yet another embodiment, apparatus 10 may be controlled by memory 14 and processor 12 to configure or pre-configure a UE with the indices and/or identifiers of other CGs to be activated. In an example, when one or more other CGs are activated due to a collision, apparatus 10 may be controlled by memory 14 and processor 12 to receive an indication from the UE for purposes of notification of the temporary CG activation, which allows the apparatus 10 to react to uplink transmission of these newly activated CGs properly. This indication may be received via dynamic control signalling, such as UCI or MAC CE, and the indication may further include at least one LCHs that have been affected by the delay caused by such resource collision. If the MAC CE is used for the indication, then the MAC CE can be included in the MAC PDU corresponding to the colliding grant that is prioritized over the deprioritized CG, and the MAC CE may further include the information relating to the timing of the anticipated CG activation, so that the apparatus 10 is able to react appropriately. Optionally, apparatus 10 may be controlled by memory 14 and processor 12 to transmit to the UE an acknowledgement in response to the notification, and the UE may activate the at least one other CG upon the reception of such acknowledgement from the apparatus 10.

Figure 4B:
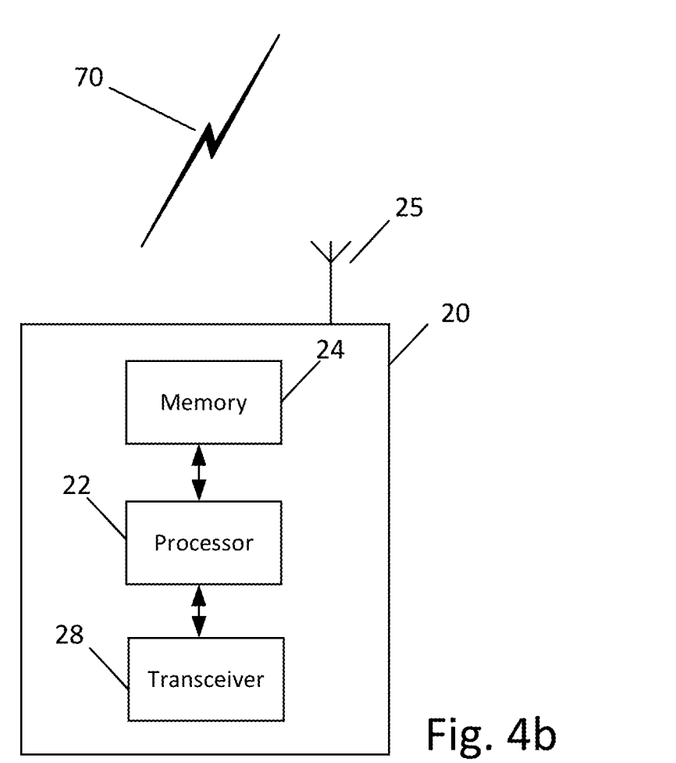
FIG. 4b illustrates an example block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-3. In certain embodiments, apparatus 20 may be configured to perform a procedure for the transmission of uplink traffic that has been deprioritized due to resource collision, for instance.

According to one embodiment, apparatus 20 may be controlled by memory 24 and processor 22 to receive a configuration (per LCH) of triggering criteria relating to resource collision from network node, such as a gNB. Apparatus 20 may also be controlled by memory 24 and processor 22 to evaluate or determine whether transmission of traffic from a LCH has suffered from a delay exceeding a certain threshold due to uplink resource collision to determine if it should temporarily change the LCP setting for this LCH.

In one example, when it is determined that the delay for transmission of traffic from the LCH does not exceed the threshold, then apparatus 20 may be controlled by memory 24 and processor 22 to proceed with processing the traffic from the LCH without modifying the LCP setting. When it is determined that the delay for transmission of traffic from the LCH exceeds the threshold, then apparatus 20 may be controlled by memory 24 and processor 22 to modify the LCP setting for this LCH. In one example, apparatus 20 may be controlled by memory 24 and processor 22 to modify LCP setting for a limited time controlled by a timer.

According to an embodiment, the LCP setting may include parameters relating to LCP and LCH mapping restrictions. In certain embodiments, the parameters relating to LCP and LCH mapping restrictions may include LCH priority, Prioritized Bit Rate (PBR), Bucket Size Duration (BSD), and LCH Mapping Restriction rule(s), such as allowedSCS-List, allowedServingCells, configuredGrantTypelAllowed, maxPUSCH-Duration, mapping rules of LCHs to CG grant configurations, and/or any other LCH mapping restriction that can be taken into account during LCP procedures. According to some embodiments, if allowedSCS-List is present, UL MAC SDUs from this logical channel can only be mapped to the indicated numerology. In some embodiments, if allowedServingCells is present, UL MAC SDUs from this logical channel can only be mapped to the serving cells indicated in this list (this is typically used for PDCP duplication to ensure the duplicates are transmitted on a different cell to the original). According to some embodiments, if configuredGrantTypelAllowed is present, UL MAC SDUs from this logical channel can be transmitted on a configured grant type 1. In some embodiments, if maxPUSCH-Duration is present, UL MAC SDUs from this logical channel can only be transmitted using uplink grants that result in a PUSCH duration shorter than or equal to the duration indicated by this field. The mapping rules of LCHs to CG grant configurations may include, for example, rules determining which LCHs may use which CG configurations. Such mapping can be explicit (e.g., CG config #1 may be used only by LCH1 and LCH2) or implicit (e.g., CG config #1 may be used only by LCHs with LCH priority higher than a threshold).

As an example, if the traffic from a LCH has been delayed for a certain amount of time exceeding a threshold, then apparatus 20 may be controlled by memory 24 and processor 22 to temporarily increase the priority level of this LCH, increase the prioritized bit rate (PBR) of this LCH, and/or modify or lift the LCH mapping restrictions so this LCH can be mapped to a wider range of grants. For example, apparatus 20 may be controlled by memory 24 and processor 22 to modify the LCH mapping restrictions such that a LCH can be temporarily served by another serving cell or another CG configurations that were originally forbidden for this LCH due to the configured LCH mapping restrictions.

In some examples, apparatus 20 may be controlled by memory 24 and processor 22 to predict the resource collision based on knowledge relating to traffic patterns and uplink resource allocation. Thus, apparatus 20 may be controlled by memory 24 and processor 22 to change the LCP parameters and/or LCH mapping restrictions of a LCH based on the prediction prior to actual occurrence of such collision.

In one example, apparatus 20 may be controlled by memory 24 and processor 22 to start a timer when the LCH is switched to a modified LCP setting. Upon the timer expiration, the LCH may fall back to the original LCP setting (including both LCP parameters and LCH mapping restriction). The timer period length may be configured by the network (e.g., gNB) or determined by the apparatus 20. Alternatively, the timer period length may be fixed by specifications.

In one example, when the LCP setting of a LCH is changed due to resource collision or foreseeable resource collision, apparatus 20 may be controlled by memory 24 and processor 22 to send an indication to the network (e.g., gNB) for purposes of notification, for example, including the indices/identifiers of the affected LCHs. This indication may be sent by dynamic control signalling such as uplink control information (UCI) or MAC control element (CE). In one example, the method may include the UE receiving, from the network (e.g., gNB), an indication acknowledging such notification, and the apparatus 20 may begin to change the LCP setting of the LCH upon the reception of the acknowledgement from the network.

According to another embodiment, apparatus 20 may be controlled by memory 24 and processor 22 to receive, from the network, a configuration including one or more of new CG transmission parameter(s) for use after the collision (e.g., periodicity, MCS, etc.), a condition under which a CG should change the at least one transmission parameter(s) (e.g., after how many collisions), and/or a duration that the new configuration should be used before changing back to default setting (e.g., a timer period).

In an example, apparatus 20 may be controlled by memory 24 and processor 22 to autonomously decrease the periodicity and/or other transmission parameters of a CG to transmit delayed traffic based on certain criteria, such as the configuration received from the network. In an embodiment, the decreasing may be done for pre-defined period of time in order to allow more frequent transmission opportunities.

Furthermore, apart from the periodicity, apparatus 20 may be controlled by memory 24 and processor 22 to autonomously modify other transmission parameters of the CG. For example, the parameters such as MCS and the number of repetitions per CG occasion may be modified to ensure the transmission of packets delayed by collision can be carried out in a rapid and also more reliable fashion, given that the delay requirement of this packet may not afford much more latency attributed to mechanisms such as hybrid automatic repeat request (HARQ) re-transmission.

In one example, apparatus 20 may be controlled by memory 24 and processor 22 to start a timer when the autonomous modification of transmission parameters of a CG is triggered. Then, within a pre-configured time interval, the CG may use a modified periodicity along with other parameters, if any. When the timer expires, apparatus 20 may be controlled by memory 24 and processor 22 to change these parameters back to the default setting.

In an example, when the autonomous modification of periodicity and parameters of a CG is triggered by the collision, apparatus 20 may be controlled by memory 24 and processor 22 to transmit an indication to the network (e.g., gNB) for purposes of providing a notification of the temporary CG parameters modification, which allows the network (e.g., gNB) to react to these changes properly. This indication may be sent by dynamic control signalling, such as UCI or MAC CE, and the content of which may further indicate at least one LCHs that have been affected by the delay caused by such resource collision. In the cases where the MAC CE is used for such indication, the MAC CE can be included in the MAC PDU corresponding to the colliding grant that is prioritized over the deprioritized CG, and the MAC CE may include the information relating to the timing of the anticipated CG re-configuration, so the network (e.g., gNB) is able to know when these changes would occur and can react appropriately. Optionally, apparatus 20 may be controlled by memory 24 and processor 22 to receive from the network (e.g., gNB) an acknowledgement in response to the notification, and apparatus 20 may begin to modify the CG periodicity and/or other parameters upon the reception of such an acknowledgement from the network.

In yet another embodiment, apparatus 20 may be controlled by memory 24 and processor 22 to receive, from the network (e.g., gNB), a configuration of the indices and/or identifiers of other CGs to be activated. In one example, apparatus 20 may be controlled by memory 24 and processor 22 to autonomously activate one or more other CGs to transmit delayed traffic based on certain criteria. For example, the criteria may include how long or how many times such the transmission has been delayed. In one example, the one or more other CGs may be activated for a pre-defined period of time. The CG(s) that are activated may be based on the indices and/or identifiers of other CGs received from the network.

In one example, apparatus 20 may be controlled by memory 24 and processor 22 to start a timer when the autonomous activation of at least one other CG is triggered. Then, within a pre-configured time interval, more than one active CGs can be used for transmitting the packets from the LCHs that have been delayed by the previous resource collision. Therefore, the corresponding LCHs can have more transmission opportunities (across multiple active CGs) during a limited time interval and hence the delayed traffic can be sent more quickly. When the timer expires, the at least one activated CGs may be automatically deactivated.

In an example, when at least one other CGs is activated due to the collision, apparatus 20 may be controlled by memory 24 and processor 22 to transmit an indication to the network (e.g., gNB) for purposes of notification of the temporary CG activation, which allows the network (e.g., gNB) to react to uplink transmission of these newly activated CGs properly. This indication may be sent by dynamic control signalling, such as UCI or MAC CE, and the content of the indication may further indicate at least one LCHs that have been affected by the delay caused by such resource collision. When the MAC CE is used for the indication, the MAC CE may be included in the MAC PDU corresponding to the colliding grant that is prioritized over the deprioritized CG, and the MAC CE may further include the information relating to the timing of the anticipated CG activation, so that the network (e.g., gNB) is able to react appropriately. Optionally, apparatus 20 may be controlled by memory 24 and processor 22 to receive from the network (e.g., gNB) an acknowledgement in response to the notification, and the apparatus 20 may activate the at least one other CG upon the reception of such acknowledgement from the network (e.g., gNB).

Therefore, certain example embodiments provide several technical improvements, enhancements, and/or advantages. For example, certain embodiments resolve at least the problem of how to facilitate rapid transmission of traffic that has been deprioritized, for instance, due to resource collision with transmission of other data or control information. As a result, example embodiments are able to handle delay-sensitive traffic. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code.

Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
   the at least one memory and computer program code configured, with the at least one processor, to cause the apparatus at least to
   receive, from a network node, a configuration per logical channel (LCH) of triggering criteria relating to resource collision;
   modify a logical channel prioritization (LCP) setting for the logical channel (LCH) based on the configuration; and
   modify logical channel prioritization (LCP) parameters or logical channel (LCH) mapping restrictions of the logical channel (LCH) based on a prediction prior to actual occurrence of a collision.

2. The apparatus according to claim 1, wherein the at least one memory and computer program code are configured, with the at least one processor, to cause the apparatus at least to:
   evaluate whether transmission of traffic from a logical channel (LCH) has experienced a delay that exceeds a threshold due to uplink resource collision to determine if the apparatus should temporarily change the logical channel prioritization (LCP) setting for the logical channel (LCH);
   when the delay for transmission of traffic from the logical channel (LCH) does not exceed the threshold, proceed with processing traffic from the logical channel (LCH) without modifying the logical channel prioritization (LCP) setting; and
   when the delay for transmission of traffic from the logical channel (LCH) exceeds the threshold, modify the logical channel prioritization (LCP) setting for the logical channel (LCH).

3. The apparatus according to claim 2, wherein, when the delay for transmission of traffic from the logical channel (LCH) exceeds the threshold, the at least one memory and computer program code are configured, with the at least one processor, to cause the apparatus at least to modify the logical channel prioritization (LCP) setting for a limited time controlled by a timer.

4. The apparatus according to claim 2, wherein, when transmission of the traffic from a logical channel (LCH) has been delayed for a certain amount of time exceeding the threshold, the at least one memory and computer program code are configured, with the at least one processor, to cause the apparatus at least to modify the logical channel prioritization (LCP) setting for the logical channel (LCH) by performing at least one of: temporarily increasing the priority level of the logical channel (LCH), increasing the prioritized bit rate (PBR) of the logical channel (LCH), or modifying or lifting the logical channel (LCH) mapping restrictions so the logical channel (LCH) can be mapped to a wider range of grants.

5. The apparatus according to claim 1, wherein the logical channel prioritization (LCP) setting comprises parameters relating to logical channel prioritization (LCP) and logical channel (LCH) mapping restrictions comprising at least one of logical channel (LCH) priority, prioritized bit rate (PBR), bucket size duration (BSD), and logical channel (LCH) mapping restriction rules, mapping rules of logical channels (LCHs) to configured grant configurations.

6. The apparatus according to claim 1, wherein the at least one memory and computer program code are configured, with the at least one processor, to cause the apparatus at least to start a timer when the logical channel (LCH) is switched to a modified logical channel prioritization (LCP) setting and, upon expiration of the timer, the logical channel (LCH) returns to the original logical channel prioritization (LCP) setting.

7. The apparatus according to claim 1, wherein, when the logical channel prioritization (LCP) setting of a logical channel (LCH) is changed due to resource collision or foreseeable resource collision, the at least one memory and computer program code are configured, with the at least one processor, to cause the apparatus at least to send an indication to the network node for purposes of notification of the setting of the logical channel (LCH) change.

8. The apparatus according to claim 7, wherein the at least one memory and computer program code are configured, with the at least one processor, to cause the apparatus at least to receive, from the network node, an acknowledgment of the notification, and to initiate the change of the logical channel prioritization (LCP) setting of the logical channel (LCH) upon the reception of the acknowledgement from the network.

9. The apparatus according to claim 1, wherein the triggering criteria comprises at least one of:
  a threshold of the time that transmission of traffic from a logical channel (LCH) has been delayed due to resource collision that trigger the logical channel prioritization (LCP) setting modification;
  a value of N consecutive collisions that trigger the logical channel prioritization (LCP) setting modification;
  a type of colliding transmission; or
a length of delaying-time of traffic from the logical channel (LCH) due to resource collision.

10. A method, comprising:
  receiving, at a user equipment, a configuration per logical channel (LCH) of triggering criteria relating to resource collision from a network node;
  modifying a logical channel prioritization (LCP) setting for the logical channel (LCH) based on the configuration; and
  modifying logical channel prioritization (LCP) parameters or logical channel (LCH) mapping restrictions of the logical channel (LCH) based on a prediction prior to actual occurrence of a collision.

11. The method according to claim 10, further comprising:
  evaluating whether transmission of traffic from a logical channel (LCH) has experienced a delay that exceeds a threshold due to uplink resource collision to determine if the user equipment should temporarily change the logical channel prioritization (LCP) setting for the logical channel (LCH);
  when the delay for transmission of traffic from the logical channel (LCH) does not exceed the threshold, proceeding with processing traffic from the logical channel (LCH) without modifying the logical channel prioritization (LCP) setting; and
  when the delay for transmission of traffic from the logical channel (LCH) exceeds the threshold, modifying the logical channel prioritization (LCP) setting for the logical channel (LCH).

12. The method according to claim 10, wherein the logical channel prioritization (LCP) setting comprises parameters relating to logical channel prioritization (LCP) and logical channel (LCH) mapping restrictions comprising at least one of logical channel (LCH) priority, prioritized bit rate (PBR), bucket size duration (BSD), and logical channel (LCH) mapping restriction rules, mapping rules of logical channels (LCHs) to configured grant configurations.

13. The method according to claim 10, wherein the triggering criteria comprises at least one of:
  a threshold of the time that transmission of traffic from a logical channel (LCH) has been delayed due to resource collision that trigger the logical channel prioritization (LCP) setting modification;
  a value of N consecutive collisions that trigger the logical channel prioritization (LCP) setting modification;
  a type of colliding transmission; or
  a length of delaying-time of traffic from the logical channel (LCH) due to resource collision.

14. An apparatus, comprising:
  at least one processor; and
  at least one memory comprising computer program code,
  the at least one memory and computer program code configured, with the at least one processor, to cause the apparatus at least to
  configure or pre-configure a user equipment with triggering criteria relating to uplink resource collision for modification of at least one of a logical channel prioritization (LCP) setting or guidelines relating to temporary logical channel prioritization (LCP) setting modification; and
  predict that the resource collision is going to happen based on knowledge of the user equipment's traffic patterns, and to send an indication to the user equipment to change the logical channel prioritization (LCP) setting of the logical channel (LCH) without waiting for the user equipment to notify the apparatus about the resource collision or foreseeable collision.

15. The apparatus according to claim 14, wherein the triggering criteria relating to uplink resource collision for modification of the logical channel prioritization (LCP) setting comprises at least one of:
  a threshold of the time that transmission of traffic from a logical channel (LCH) has been delayed due to resource collision that trigger the logical channel prioritization (LCP) setting modification;
  a value of N consecutive collisions that trigger the logical channel prioritization (LCP) setting modification;
  a type of colliding transmission; or
  a length of delaying-time of traffic from the logical channel (LCH) due to resource collision.

16. The apparatus according to claim 14, wherein the guidelines relating to temporary logical channel prioritization (LCP) setting modification comprises at least one of:
  a conditional logical channel prioritization (LCP) setting to be applied if the criteria relating to resource collision are met;
  a list of existing logical channel (LCH) mapping restrictions that should be lifted or modified if the triggering criteria are met; or
  a timer period length where the modified logical channel prioritization (LCP) setting should be used once triggered, in terms of orthogonal frequency division multiplex (OFDM) symbols, mini-slots, slots, or standard time units such as seconds.

17. The apparatus according to claim 14, wherein the at least one memory and computer program code are configured, with the at least one processor, to cause the apparatus at least to receive an indication from the user equipment to notify of the change in logical channel prioritization (LCP) setting.

18. The apparatus according to claim 17, wherein the at least one memory and computer program code are configured, with the at least one processor, to cause the apparatus at least to send to the user equipment an indication acknowledging the indication received to notify of the logical channel prioritization (LCP) setting change.

* * * * *